United States Patent
Ladd et al.

(10) Patent No.: US 9,948,985 B2
(45) Date of Patent: Apr. 17, 2018

(54) METHOD AND APPARATUS FOR NETWORK ASSOCIATION OF CONTENT

(71) Applicant: Time Warner Cable Enterprises LLC, New York, NY (US)

(72) Inventors: Patrick Ladd, San Marcos, CA (US); George W. Sarosi, Niwot, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 14/802,494

(22) Filed: Jul. 17, 2015

(65) Prior Publication Data

US 2015/0326926 A1 Nov. 12, 2015

Related U.S. Application Data

(62) Division of application No. 12/497,162, filed on Jul. 2, 2009, now Pat. No. 9,094,713.

(51) Int. Cl.
*H04N 21/43* (2011.01)
*H04N 21/4627* (2011.01)
(Continued)

(52) U.S. Cl.
CPC ..... *H04N 21/4627* (2013.01); *H04N 21/2541* (2013.01); *H04N 21/25816* (2013.01);
(Continued)

(58) Field of Classification Search
None
See application file for complete search history.

(56) References Cited

U.S. PATENT DOCUMENTS

| 5,535,206 A | 7/1996 | Bestler et al. |
| 5,625,405 A | 4/1997 | Dulac et al. |

(Continued)

FOREIGN PATENT DOCUMENTS

| CA | 2376550 A1 | 12/2000 |
| CA | 2376550 C | 8/2008 |

(Continued)

OTHER PUBLICATIONS

Metadata Specifications, CableLabs Asset Distribution Interface Specification, Version 1.1 MD-SP-ADI 1-104-060505, May 5, 2006.

(Continued)

*Primary Examiner* — Cai Chen
(74) *Attorney, Agent, or Firm* — Gazdzinski & Associates, PC

(57) ABSTRACT

Methods and apparatus for perform association of stored content downloaded over a network with a unique identification. In one embodiment, the content is stored locally, and the association is performed in a secure manner using network or source-specific information (e.g., the organization identification or "orgID" of the bearer network or MSO). This association is used to ensure that the content stored on the playback device can be accessed for viewing only when the playback device is connected to the same network from which the content was obtained. Use of the orgID allows the content association and protection functionality to be implemented in existing networks with only minor software changes.

22 Claims, 8 Drawing Sheets

(51) Int. Cl.
*H04N 21/258* (2011.01)
*H04N 21/254* (2011.01)
*H04N 21/433* (2011.01)
*H04N 21/436* (2011.01)
*H04N 21/4367* (2011.01)
*H04N 21/8352* (2011.01)

(52) U.S. Cl.
CPC ... *H04N 21/25875* (2013.01); *H04N 21/4334* (2013.01); *H04N 21/4367* (2013.01); *H04N 21/43615* (2013.01); *H04N 21/8352* (2013.01)

(56) References Cited

U.S. PATENT DOCUMENTS

| | | | |
|---|---|---|---|
| 5,835,125 A | 11/1998 | Bhagavath | |
| 5,841,468 A | 11/1998 | Wright | |
| 5,844,897 A | 12/1998 | Asamizuya | |
| 5,917,538 A | 6/1999 | Asamizuya | |
| 5,940,370 A | 8/1999 | Curtis et al. | |
| 5,991,308 A | 11/1999 | Fuhrmann et al. | |
| 6,009,098 A | 12/1999 | Asamizuya | |
| 6,137,793 A | 10/2000 | Gorman et al. | |
| 6,144,401 A | 11/2000 | Casement et al. | |
| 6,240,401 B1 | 5/2001 | Oren et al. | |
| 6,292,624 B1 | 9/2001 | Saib et al. | |
| 6,369,840 B1 | 4/2002 | Barnett et al. | |
| 6,560,203 B1 | 5/2003 | Beser et al. | |
| 6,591,420 B1 | 7/2003 | McPherson et al. | |
| 6,622,305 B1 | 9/2003 | Willard | |
| 6,760,918 B2 | 7/2004 | Rodriguez et al. | |
| 6,772,434 B1 | 8/2004 | Godwin | |
| 6,775,778 B1 | 8/2004 | Laczko, Sr. et al. | |
| 6,792,577 B1 | 9/2004 | Kimoto | |
| 6,802,077 B1 | 10/2004 | Schlarb | |
| 6,810,528 B1 | 10/2004 | Chatani | |
| 6,817,028 B1 | 11/2004 | Jerding et al. | |
| 6,826,267 B2 | 11/2004 | Daum et al. | |
| 6,851,063 B1 | 2/2005 | Boyle et al. | |
| 6,853,731 B1 | 2/2005 | Boyle et al. | |
| 6,857,132 B1 | 2/2005 | Rakib et al. | |
| 6,909,726 B1 | 6/2005 | Sheeran | |
| 6,959,288 B1 | 10/2005 | Medina et al. | |
| 7,016,376 B1 | 3/2006 | Goldenberg et al. | |
| 7,028,009 B2 | 4/2006 | Wang et al. | |
| 7,069,577 B2 | 6/2006 | Geile et al. | |
| 7,073,193 B2 | 7/2006 | Marsh | |
| 7,080,397 B2 | 7/2006 | Cochran et al. | |
| 7,124,195 B2 | 10/2006 | Roach et al. | |
| 7,136,573 B2 | 11/2006 | Kikuchi et al. | |
| 7,146,630 B2 | 12/2006 | Dravida et al. | |
| 7,171,485 B2 | 1/2007 | Roach et al. | |
| 7,194,001 B2 | 3/2007 | Leatherbury et al. | |
| 7,194,009 B2 | 3/2007 | Eng | |
| 7,203,311 B1 | 4/2007 | Kahn et al. | |
| 7,209,892 B1 | 4/2007 | Galuten et al. | |
| 7,213,742 B1 | 5/2007 | Birch et al. | |
| 7,216,170 B2 | 5/2007 | Ludvig et al. | |
| 7,257,308 B2 | 8/2007 | Plourde et al. | |
| 7,263,187 B2 | 8/2007 | Pedlow, Jr. et al. | |
| 7,263,188 B2 | 8/2007 | Kohno | |
| 7,337,459 B1 | 2/2008 | Tsutsui et al. | |
| 7,386,621 B1 | 6/2008 | Hlasny | |
| 7,533,376 B2 | 5/2009 | Anwar et al. | |
| 7,647,618 B1 | 1/2010 | Hunter et al. | |
| 7,805,515 B2 | 9/2010 | Riley | |
| 7,843,876 B2 | 11/2010 | Holt et al. | |
| 7,849,491 B2 | 12/2010 | Perlman | |
| 7,878,908 B2 | 2/2011 | Sloate et al. | |
| 7,908,626 B2 | 3/2011 | Williamson et al. | |
| 7,984,473 B1 | 7/2011 | Casile et al. | |
| 8,006,262 B2 | 8/2011 | Rodriguez et al. | |
| 8,006,273 B2 | 8/2011 | Rodriguez | |
| 8,015,583 B2 | 9/2011 | Bates et al. | |
| 8,028,322 B2 | 9/2011 | Riedl et al. | |
| 8,055,585 B2 | 11/2011 | Wu | |
| 8,424,048 B1 | 4/2013 | Lyren et al. | |
| 2002/0004870 A1 | 1/2002 | Kobayashi | |
| 2002/0013940 A1 | 1/2002 | Tsukamoto et al. | |
| 2002/0042921 A1 | 4/2002 | Ellis | |
| 2002/0046406 A1 | 4/2002 | Chelehmal et al. | |
| 2002/0046407 A1 | 4/2002 | Franco | |
| 2002/0054754 A1 | 5/2002 | Kikuchi | |
| 2002/0059619 A1 | 5/2002 | Lebar | |
| 2002/0059635 A1 | 5/2002 | Hoang | |
| 2002/0083456 A1 | 6/2002 | Bates et al. | |
| 2002/0087661 A1 | 7/2002 | Matichuk | |
| 2002/0099642 A1 | 7/2002 | Schwankl et al. | |
| 2002/0104019 A1 | 8/2002 | Chatani et al. | |
| 2002/0138854 A1 | 9/2002 | Desai | |
| 2002/0166121 A1 | 11/2002 | Rovira | |
| 2002/0196940 A1 | 12/2002 | Isaacson et al. | |
| 2003/0005453 A1 | 1/2003 | Rodriguez et al. | |
| 2003/0037335 A1 | 2/2003 | Gatto et al. | |
| 2003/0049021 A1 | 3/2003 | Kamieniecki | |
| 2003/0053476 A1 | 3/2003 | Sorenson et al. | |
| 2003/0058887 A1 | 3/2003 | Dworkin et al. | |
| 2003/0070052 A1 | 4/2003 | Lai | |
| 2003/0093515 A1 | 5/2003 | Kauffman | |
| 2003/0093806 A1 | 5/2003 | Dureau et al. | |
| 2003/0118014 A1* | 6/2003 | Iyer | H04N 5/782 370/389 |
| 2003/0208768 A1 | 11/2003 | Urdang et al. | |
| 2003/0217365 A1 | 11/2003 | Caputo | |
| 2003/0229898 A1 | 12/2003 | Babu et al. | |
| 2003/0231661 A1 | 12/2003 | Depietro et al. | |
| 2004/0025181 A1 | 2/2004 | Addington et al. | |
| 2004/0025190 A1 | 2/2004 | McCalla et al. | |
| 2004/0049694 A1 | 3/2004 | Candelore | |
| 2004/0123125 A1 | 6/2004 | Zuili | |
| 2004/0163129 A1 | 8/2004 | Chapman et al. | |
| 2004/0255139 A1* | 12/2004 | Giobbi | G06F 21/10 713/193 |
| 2004/0255335 A1 | 12/2004 | Fickle et al. | |
| 2004/0264511 A1 | 12/2004 | Futch et al. | |
| 2005/0022247 A1 | 1/2005 | Bitran et al. | |
| 2005/0028208 A1 | 2/2005 | Ellis et al. | |
| 2005/0038904 A1 | 2/2005 | Dougall | |
| 2005/0071882 A1 | 3/2005 | Rodriguez et al. | |
| 2005/0091681 A1 | 4/2005 | Borden et al. | |
| 2005/0153778 A1 | 7/2005 | Nelson et al. | |
| 2005/0204019 A1 | 9/2005 | Flynn et al. | |
| 2005/0223032 A1 | 10/2005 | Shan et al. | |
| 2005/0251454 A1 | 11/2005 | Wood | |
| 2005/0278741 A1 | 12/2005 | Robarts et al. | |
| 2005/0278760 A1 | 12/2005 | Dewar et al. | |
| 2005/0289618 A1 | 12/2005 | Hardin | |
| 2006/0013557 A1 | 1/2006 | Poslinski | |
| 2006/0036750 A1 | 2/2006 | Ladd et al. | |
| 2006/0047603 A1 | 3/2006 | Fontijn | |
| 2006/0089911 A1 | 4/2006 | Dandekar et al. | |
| 2006/0130107 A1 | 6/2006 | Gonder et al. | |
| 2006/0130113 A1 | 6/2006 | Carlucci et al. | |
| 2006/0167808 A1 | 7/2006 | Greene et al. | |
| 2006/0173787 A1 | 8/2006 | Weber et al. | |
| 2006/0200559 A1 | 9/2006 | Ling et al. | |
| 2006/0200865 A1 | 9/2006 | Leake, Jr. et al. | |
| 2006/0206565 A1 | 9/2006 | Ganesan et al. | |
| 2006/0218604 A1 | 9/2006 | Riedl et al. | |
| 2006/0294371 A1 | 12/2006 | Fanning | |
| 2007/0083899 A1 | 4/2007 | Compton et al. | |
| 2007/0107035 A1 | 5/2007 | Howe et al. | |
| 2007/0280110 A1 | 12/2007 | Murphy et al. | |
| 2008/0139193 A1 | 6/2008 | Hao et al. | |
| 2009/0235319 A1 | 9/2009 | Mao et al. | |
| 2009/0249473 A1* | 10/2009 | Cohn | H04L 29/12028 726/15 |
| 2010/0107194 A1 | 4/2010 | McKissick et al. | |
| 2010/0146539 A1 | 6/2010 | Hicks, III et al. | |
| 2010/0287584 A1* | 11/2010 | Starikov | H04N 7/163 725/28 |
| 2011/0040755 A1 | 2/2011 | Hindle | |

(56) References Cited

U.S. PATENT DOCUMENTS

| | | |
|---|---|---|
| 2011/0041146 A1 | 2/2011 | Lewis |
| 2012/0005756 A1 | 1/2012 | Hoefelmeyer |
| 2013/0239135 A1* | 9/2013 | Parker .................. H04N 7/1675 |
| | | 725/31 |

FOREIGN PATENT DOCUMENTS

| | | |
|---|---|---|
| CA | 2438497 C | 11/2013 |
| WO | WO-0110125 A1 | 2/2001 |
| WO | WO-0160071 A2 | 8/2001 |

OTHER PUBLICATIONS

Motorola Next-Generation CMTS Architecture Protecting Network Investments While Migrating to Next-Generation CMTS Platforms, 2004 Motorola, Inc.

* cited by examiner

US 9,948,985 B2

METHOD AND APPARATUS FOR NETWORK ASSOCIATION OF CONTENT

PRIORITY AND RELATED APPLICATIONS

This application is a divisional of and claims priority to co-owned, U.S. patent application Ser. No. 12/497,162 filed on Jul. 2, 2009 of the same title, issuing as U.S. Pat. No. 9,094,713 on Jul. 28, 2015, which is incorporated herein by reference in its entirety. This application is related to commonly owned U.S. patent application Ser. No 11/080,693 filed Mar. 14, 2005 and entitled "METHOD AND APPARATUS FOR NETWORK CONTENT DOWNLOAD AND RECORDING", issued as U.S. Pat. No. 8,028,322 on Sep. 28, 2006 incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to content distribution networks and content control. In one exemplary aspect, the invention relates to the use of identification and security (e.g., cryptographic) functions to make an association between content downloaded by a network device, and the network to which the device is coupled.

2. Description of Related Technology

Recently, Digital Video Recorders (DVRs) have become a popular consumer product. A DVR allows personalized control over a multimedia program in the form of "trick modes" (e.g. pause, rewind, fast forward) while watching it as well as providing "time shifting" capabilities by recording the program to local storage. Time shifting allows the user to watch a program at the time they want, not just when broadcast. This application is also commonly referred to as Personalized Video Recorder (PVR).

Early implementations of DVR used analog video capture and compression techniques to convert multimedia content into a digital format (e.g., MPEG bitstream) for storage on a local storage device. Recently, content distribution network operators such as cable MSO's and digital television broadcast satellite operators have began offering DVR functionality in the consumer premises equipment (CPE) used to receive and decode digital multimedia programming.

Inclusion of the DVR functionality with a digital set-top box makes the intermediate stage of conversion of multimedia program to/from analog format unnecessary. Since content is made available over the network in digital format, an exact copy of the content can be stored locally (e.g., on a hard drive within the CPE). While this approach improves the fidelity of content for the end user, it raises copyright concerns for content owners/developers and network operators. For example, network operators have desired a solution such that valuable multi-media content downloaded from their network and stored on a CPE is somehow intrinsically tied to that network, so that it cannot be played back if the CPE is disconnected from the originating network or the content is otherwise transferred to another device.

A variety of approaches to content distribution, storage and copyright protection/digital rights management are present in the prior art. For example, U.S. Pat. No. 6,240,401 to Oren, et al. issued May 29, 2001 entitled "System and method for movie transaction processing", U.S. Pat. No. 6,851,063 to Boyle, et al. issued Feb. 1, 2005 entitled "Digital video recorder employing a file system encrypted using a pseudo-random sequence generated from a unique ID", U.S. Pat. No. 6,853,731 to Boyle, et al. issued Feb. 8, 2005 entitled "Digital video recorder employing a unique ID to interlock with encrypted video programs stored on a storage device", United States Patent Publication No. 20020104019 to Chatani, et al. published Aug. 1, 2002 entitled "Method and system for securely distributing computer software products", United States Patent Publication No. 20030049021 to Kamieniecki, published Mar. 13, 2003 and entitled "Apparatus for monitoring of DVD/CD usage and targeted DVD/CD sales utilizing a set to with DVD/CD capability", and United States Patent Application No. 20040255139 to Giobbi published Dec. 16, 2004 entitled "Digital content security system".

Other well-known approaches to digital rights and copyright management exist in the prior art. For example, several commercially available digital watermarking approaches including Digimarc®, SysCoP™, EIKONAmark™ can be used to embed steganographic data within the recorded or streamed content. Media rights management systems such as the Microsoft Windows® Media Digital Rights Manager (DRM), and the new Windows Media Player 9, may be used as well.

However, despite the variety of different prior art techniques for providing content playback security in a digital video recording system, none address the particular issue of determining whether content selected for playback was obtained from the same network to which the playback device is currently connected. Accordingly, improved methods and apparatus for enforcing a network operator's content security, and associated business rules, are needed. Such improved methods and apparatus would ideally be implemented with only minimal modifications to the extant infrastructure and prevailing CPE software architectures, thereby allowing for ready implementation and backward compatibility in existing network applications.

SUMMARY OF THE INVENTION

The present invention addresses the foregoing needs by providing methods and apparatus for network association of content using one or more unique identifiers.

In a first aspect of the invention, a method providing content over a content-based network is disclosed. In one embodiment, the method comprises: receiving content at a client device coupled to the network; storing at least a portion of the content on a storage device in data communication with the client device; associating first information relating to a source of the content with the at least portion of the content being stored; initiating a playback of the stored content at the client device, the act of initiating comprising: authenticating an application desiring the playback using a cryptographic signature; receiving second information at the client device relating to the network to which the client device is currently coupled; analyzing the first information and the second information to determine if the content source is authorized by the network; and based on the analyzing, selectively allowing or restricting the playback of the content on the client device.

In a second aspect of the invention improved consumer premises equipment (CPE) adapted for connection to a content-based network is disclosed. In one embodiment, the network has a plurality of information sources associated therewith, and the CPE is adapted for receipt of content from one or more of these sources via the network, the CPE further comprising: a processor; a storage device in data communication with the processor; and software adapted to run on the processor, the software being further adapted to: store at least a portion of the content on the storage device; and associate first information relating to at least one of the sources or the network with the at least portion of the content.

In a third aspect of the invention, a method of operating consumer premises equipment (CPE) in communication with a content-based network is disclosed. In one embodiment, the method comprises: receiving content at the CPE; storing at least a portion of the content on a storage device in data communication with the CPE; and associating first information relating to at least one source of the content with the at least portion of the content.

In a fourth aspect of the invention, a method of operating a content-based network so as to limit the playback of content distributed over the network to only certain devices coupled to the network is disclosed. In one embodiment, the method comprises: receiving content at one of the devices; storing at least a portion of the content on a storage device in data communication with the one device; associating first information relating to the source of the content with the at least portion of the content; subsequently receiving second information at one of the devices; analyzing the first information and the second information; and based on the analyzing, selectively allowing or restricting the playback of the content.

In a fifth aspect of the invention, a storage device is disclosed. In one embodiment, the storage device comprises: a storage medium adapted to store a computer program; and a computer program stored on the medium, the program adapted to run on a device and: receive content at the device; store at least a portion of the content on a storage device in data communication with the device; associate first information relating to the source of the content with the at least portion of the content; subsequently receive second information; analyze the first information and the second information; and based at least in part on the analysis, selectively allow or restrict playback of the content.

In a sixth aspect of the invention, a computerized device adapted for use with a client device is disclosed. In one embodiment, the computerized device is in data communication with the client device and adapted to: store content received at the client device; store information uniquely identifying the source of the content with the content; subsequently receive a playback request for the stored content from a requesting entity; provide the identifying information to the requesting entity; thereafter, receiving a signal indicating that playback is allowed; and after receipt of the signal, play back the stored content. In one variant, the requesting entity comprises an application program running on the client device, the client device being communicatively coupled to a content based network, the identifying information comprising an organization ID (orgID) associated with the network.

In a seventh aspect of the present disclosure, a server device is disclosed. In one embodiment thereof, the server device is disposed at a head-end of a content deliver network, and the server device includes: a storage medium including a computer program stored thereon; and a processor configured to execute the computer program, the computer program including a plurality of instructions. In one variant, the instructions are configured to, when executed, cause the server device to receive digitally rendered programming content distributed to a client device via the content deliver network; cause the digitally rendered programming content to be stored on a network storage device disposed at the head-end, the network storage device being in data communication with the client device; associate (i) first information identifying a first network coupled to a source of the digitally rendered programming content with (ii) the digitally rendered programming content, the association including a creation of a data structure associated with the digitally rendered programming content, the data structure including the first information encrypted within the data structure; analyze the first information identifying the first network and subsequently received second information identifying a second network coupled to the client device; and based at least in part on the analysis, decrypt the first information from the data structure associated with the digitally rendered programming content, and allow playback of the programming content at the client device.

In an eighth aspect of the present disclosure, a server device is disclosed. In one embodiment thereof, the service is in data communication via a network with a client device, and the server device is configured to store, in a network storage device, digitally rendered programming content received by the client device over the network; store, in the network storage device, information which uniquely identifies a source network of the digitally rendered programming content with the programming content, subsequently receive a playback request for the stored digitally rendered programming content from a requesting entity; based at least on a match between (i) the information which uniquely identifies the source network and (ii) information which uniquely identifies a network associated with the requesting entity, determine whether display of the digitally rendered programming content by the requesting entity is permitted; and after the determination, selectively enable the digitally rendered programming content to be retrieved from the network storage device and displayed by the requesting entity.

DETAILED DESCRIPTION OF THE INVENTION

Figure 1:
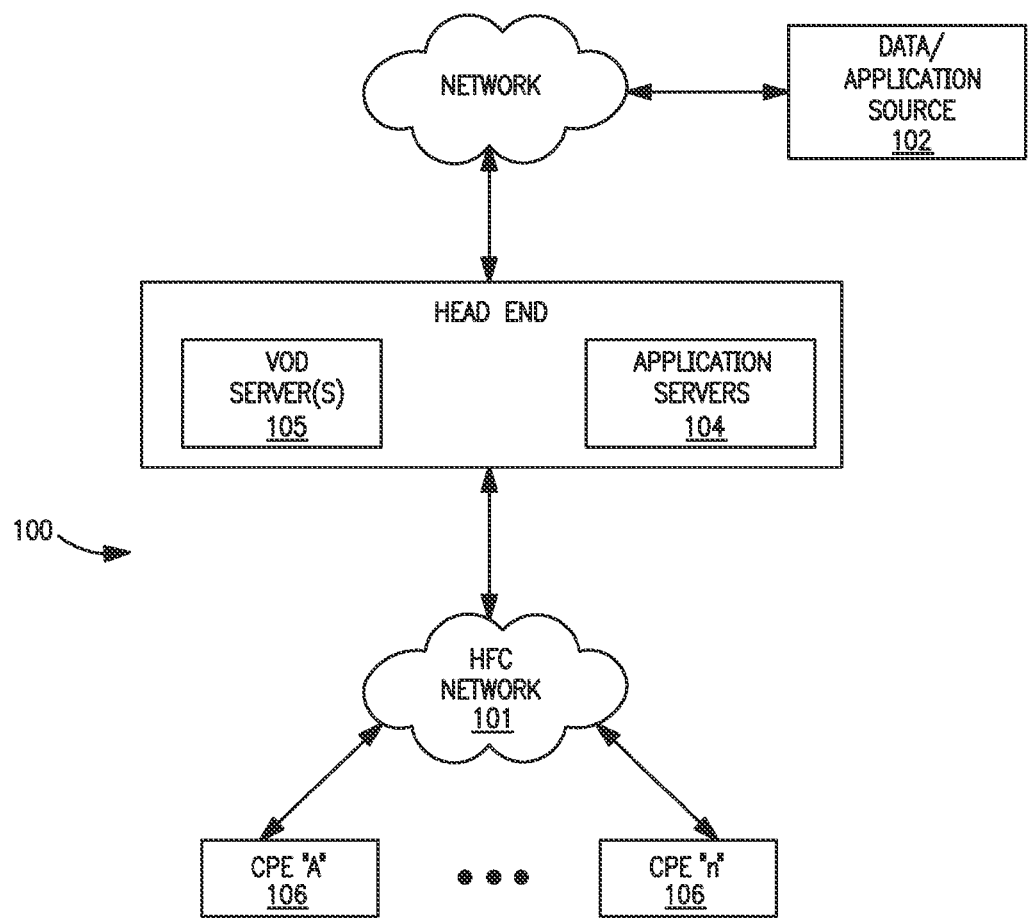
FIG. 1 is a functional block diagram illustrating an exemplary HFC network configuration useful with the present invention.

Reference is now made to the drawings wherein like numerals refer to like parts throughout.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multi-systems/service operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that customers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX/6XXX and Scientific Atlanta Explorer 2XXX/3XXX/4XXX/8XXX series digital devices, personal digital assistants (PDAs), handheld computers, personal communicators, J2ME equipped devices, cellular telephones, 3G "smartphones", or literally any other device capable of interchanging data with a network.

Similarly, the terms "Customer Premises Equipment (CPE)" and "host device" refer to any type of electronic equipment located on or within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes electronic equipment such as for example set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "network operator" refers generally to an entity, other than a home or end-user, involved in manufacturing, design, deployment or maintenance of a bearer network, including without limitation cable system operators, satellite providers, DSL internet providers, client device manufacturers, etc.

As used herein, the term "content" refers to any type of information or signals which can be transmitted over a network, whether digital, analog or otherwise. Examples of content include, without limitation, MPEG streams (e.g., movies), data files, encrypted data, audio data, games, and the like.

As used herein, the term "content provider" refers generally to an entity which directly or indirectly provides or generates content, including without limitation studios, networks, channels (e.g., "The Movie Channel"), gaming content and application developers, musical artists, record labels, etc.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e,g., silicon "die"), or distributed among two or more substrates. Furthermore, various functional aspects of the processor may be implemented solely as software or firmware associated with the processor.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

As used herein, the term "middleware" refers generally computer programs or other functionality that provides a functional interface between the hardware/firmware and software of a CPE, host device or client device. One exemplary embodiment of middleware comprises a protocol stack function provided by OCAP-compliant middleware in a cable set-top box, or similar function in a satellite receiver, that resides below the application layer.

Overview

In one aspect, the present invention provides a mechanism by which access to recorded or stored content is controlled, so that correspondence between the source of the content and the platform from which access to the content is requested can be affirmatively established. This correspondence provides the network operator (as well as the content provider) a high level of assurance that the copyright and other intellectual property restrictions associated with the content are observed by the consumer, and that surreptitious attempts to "steal" the recorded content are frustrated.

In one exemplary embodiment, the invention comprises a content association "manager" in the form of software (e.g., "middleware") that is provided, such as by download, to a set-top box or other CPE by the network operator. When a DVR or similar application software module resident on the CPE makes a request to this middleware for access to local storage for recording content, the middleware uses unique information such as a character string transmitted by the bearer network and contained within a digital certificate to uniquely identify the bearer network intrinsically within or in association with the stored content. When a playback application requests access to the stored content, the middleware implementation extracts the bearer network identification of the content, and allows access only if the identification matches with that of the current network to which the playback device is connected.

In the exemplary embodiment, the association of content with bearer network is further made secure through use of a cryptographic approach to application authentication that uses signed digital certificates.

In one variant, the middleware implementation comprises Opencable Application Platform (OCAP)-compliant middleware running on an OCAP-compliant CPE, and the cryptographic method uses application signature files and a digital certificate chain specified by CableLabs OCAP Security specification. Additionally, the application programming interface (API) between the middleware and DVR or similar applications implements the DVR API specified by Cable-Labs.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multi-systems operator (MSO), digital networking capability and middleware-based CPE, the general principles and advantages of the invention may be extended to other types of networks and architectures, whether broadband, narrowband, wired or wireless, terrestrial or satellite, or otherwise, the following therefore being merely exemplary in nature.

It will also be appreciated that while described generally in the context of a network providing service to a customer (i.e., home) end user domain, the present invention may be readily adapted to other types of environments including, e.g., commercial/enterprise, and government/military applications. Myriad other applications are possible.

Furthermore, while described primarily in the context of traditional media content (e.g., movies, music/music videos, audiovisual data, etc.), the methods and apparatus disclosed herein are equally applicable to other forms of information or data, including without limitation software applications (including distributed applications) and other software modules, middleware, and computer or data files. Herein lies another salient advantage of the present invention; i.e., that the identification parameter(s) used to associate the content and network (or other entity, as described in detail below) are substantially agnostic to the type of content with which they are utilized.

System Architecture—

FIG. 1 illustrates a typical network component configuration with which the network/content association apparatus and methods of the present invention may be used. The various components of the network 100 include (i) one or more application origination points 102; (ii) one or more distribution servers 104; and (iii) consumer premises equipment (CPE) 106. The distribution server(s) 104 and CPE(s) 106 are connected via a bearer (e.g., HFC) network 101. A simple architecture comprising one of each of the aforementioned components 102, 104, 106 is shown in FIG. 1 for simplicity, although it will be recognized that comparable architectures with multiple origination points, distribution servers, and/or CPE devices (as well as different network topologies) may be utilized consistent with the invention. For example, the head-end architecture of FIG. 1a (described in greater detail below) may be used.

The application origination point 102 comprises any medium that allows an application to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The distribution server 104 comprises a computer system where one or more applications can enter the network system. Distribution servers are well known in the networking arts, and accordingly not described further herein.

The CPE 106 includes any equipment in the "consumers' premises" (or other locations, whether local or remote to the distribution server 104) that can be accessed by a distribution server 104. Such CPE 106 may comprise processors and associated computer memory adapted to store and run the downloaded or resident application. In the present context of the content association manager, at least a portion of the software (e.g., middleware components used to manage and determine the association between the content and the network) is downloaded or otherwise provided to the CPE 106, wherein the latter executes the downloaded software/components. The software agent may be (i) "pushed" to the CPE (i.e., wherein the distribution server causes the software download to occur), (ii) "pulled" to the CPE (i.e., where the CPE causes the download), (iii) downloaded as the result of some third entity or device (such as a remote server); (iv) resident on the CPE at startup; or (v) combinations of the foregoing.

Figure 1A:
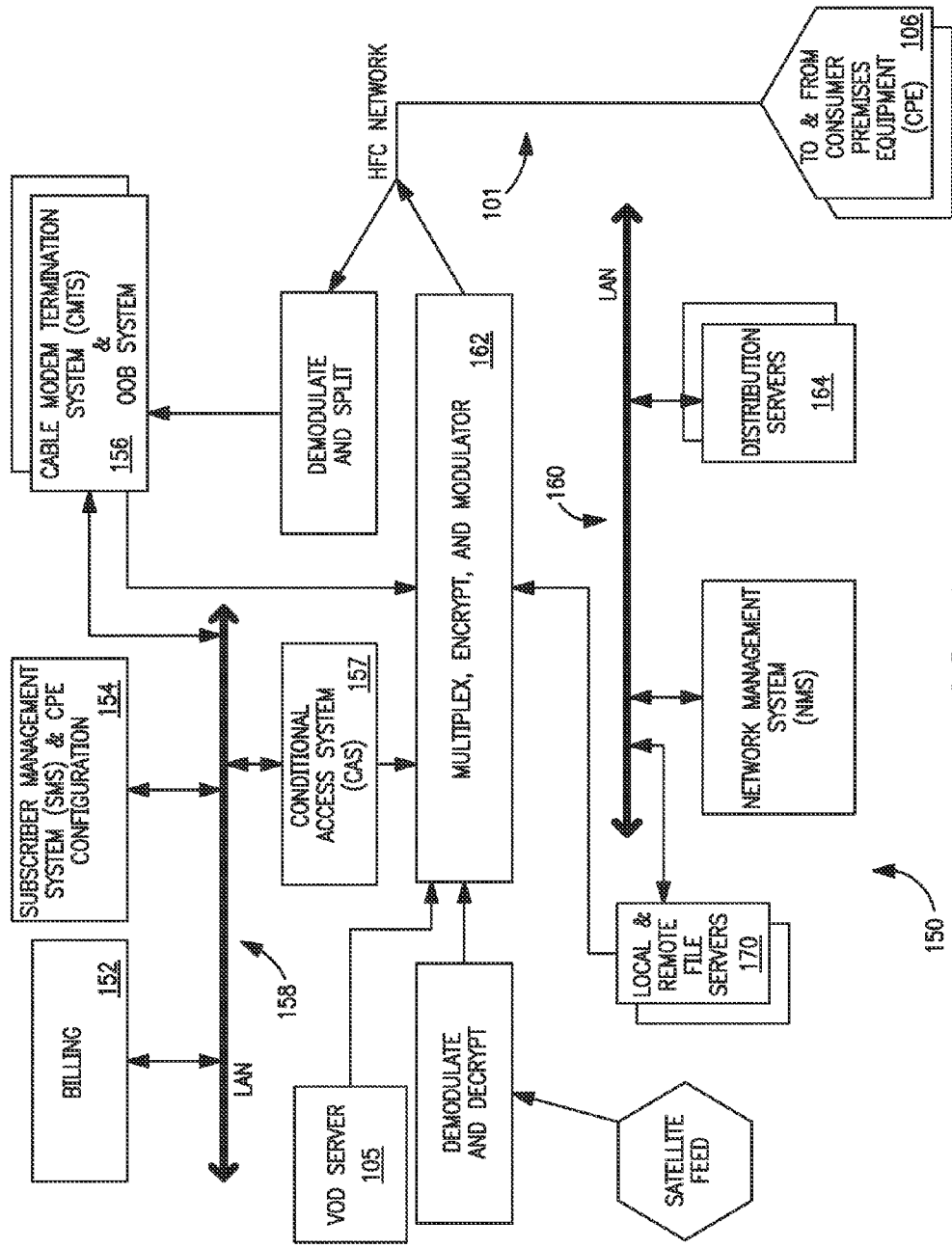
FIG. 1a is a functional block diagram illustrating one exemplary head-end configuration of an HFC network useful with the present invention.

Referring now to FIG. 1a, one exemplary embodiment of the network head-end architecture useful with the invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 and adapted to "condition" content for transmission over the network. In the present context, the distribution servers 104 are coupled to the LAN 160, which provides access to the MEM 162 and network 101 via one or more file servers 170. In the typical HFC network, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs of the type shown in FIG. 1.

Content (e.g., audio, video, etc.) or data is provided in each downstream (in-band) channel. To communicate with the head end the CPE 106 use the out-of-band (OOB) DAVIC or DOCSIS channels and associated protocols. The OCAP 1.0 specification provides for networking protocols both downstream and upstream.

It will also be recognized that the multiple servers (OD or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

One exemplary multi-server architecture particularly useful with the present invention is described in co-pending and co-owned United States Patent Application Publication No. 20020059619 to Lebar published May 16, 2002 and entitled "Hybrid central/distributed VOD system with tiered content structure" which is incorporated herein by reference in its entirety. Specifically, a hybrid central/distributed and tiered video on demand (VOD) service network with tiered content structure is disclosed. In particular, the system uses media servers located in both the head-end and huh stations. Set-top boxes generally would be supplied VOD services from the high-demand content media (and data) servers located in the hub station nearest to the user. The central media server located in the head-end would be used as an installed backup to the hub media servers; as the primary source for lower demand VOD services and as the source of the real time, centrally encoded programs with PVR (personal video recorder) capabilities. By distributing the servers to the hub stations, the size of the fiber transport network associated with delivering VOD services from the central head-end media server is reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network and the reduced storage capacity requirements for hub servers.

To distribute files and applications to the CPE 106, the files and applications are configured as data and object carousels and may be sent in both the in-band and OOB channels. As is well known in the art, a carousel maybe viewed as a directory containing files. The files of the carousel utilized herein are sent in a continuous round-robin fashion. If the client device misses a desired or necessary file in one carousel transmission, it can wait for the next. Alternatively in another embodiment, the CPE portion of the application is configured as part of the program content on a given in-band, DAVIC, or DOCSIS channel. As yet another embodiment, the CPE portion is downloaded directly using IP (Internet Protocol) packet traffic in an Out-Of-Band DAVIC or DOCKS channel. Note that the file carousel or other device providing the application to the CPE 106 via the aforementioned communication channels may be the distribution server 104 previously described, or alternatively a separate device which may or may not be physically co-located with the server (e.g., remote file servers 170 of FIG. 1*a*). For example, a remote file storage device (not shown) with carousel capability may be in data communication with the client device(s) via an out-of-band communications channel as described below, the download of the application files from the remote device being initiated by way of a query from the client device, or alternatively a signal generated by the server 104 and transmitted to the remote device.

High speed data download (including download of files and applications such as those associated with the content association management software of the present invention) may also be provided over the network using e.g., the apparatus and methodology described in co-owned and co-pending U.S. application Ser. No. 11/013,665, filed Dec. 15, 2004 entitled "METHOD AND APPARATUS FOR HIGH BANDWIDTH DATA TRANSMISSION IN CONTENT-BASED NETWORKS", incorporated herein by reference in its entirety. In this approach, extant VOD or similar infrastructure is utilized to provide high-speed data download sessions between the VOD server and the user's CPE.

Many other permutations of the foregoing system components and communication methods may also be used consistent with the present invention, as will be recognized by those of ordinary skill in the field.

Association and Validation Methodologies—

Prevalent middleware specifications such as OCAP, Advanced Common Application Platform (ACAP), Multimedia Home Platform (MHP) and Globally Executable MHP (GEM) require that entities who develop applications, including those adapted for use or distribution over content-based networks such as cable and satellite networks, register themselves with a global registration authority. See, e.g., OpenCable™ Application Platform (OCAP) Specification 1.0 (OC-SP-OCAP1.0-I16-050803), Copyright 2001-2005 and OCAP Specification 1.1 (OC-SP-OCAP1.1.1-090612), Copyright 2001-2009. This authority issues a globally unique identifier for each registered entity. This identifier is known as an organization identifier; also referred to as "organization_id", "org_id", "organizationID", or "orgID", each of the foregoing being synonymous for the purposes of the present embodiment.

In the exemplary cable context, the OpenCable Application Platform (OCAP) middleware specification published by CableLabs prescribes a chain of digital certificates to validate the authenticity of applications. An application known as the monitor application is provided with OCAP implementation on each CPE and contains a digital certificate that is tied to the network to which that CPE is connected.

The aforementioned exemplary cable specifications provide for applications owned by an MSO to be downloaded to, and execute within, the customer's CPE 106. When the CPE is connected to the bearer network 101, the network operator may download a DVR/PVR or similar application that can record or otherwise store valuable content to persistent storage within the CPE (or an associated device).

Figure 2:
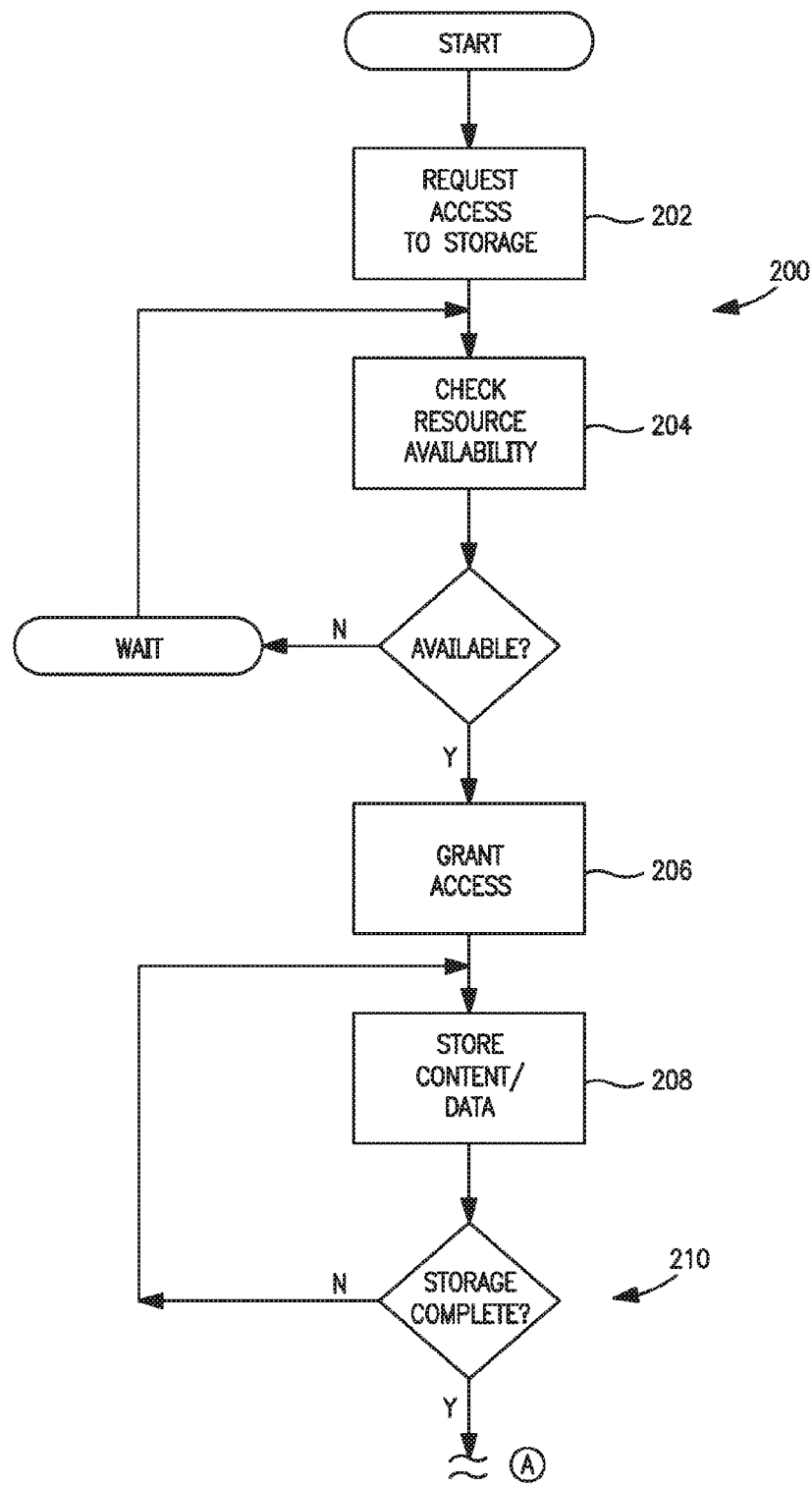
FIG. 2 is a logical flow diagram illustrating one exemplary method of associating an identification parameter (e.g., organization ID) with content according to the present invention.
Figure 2:
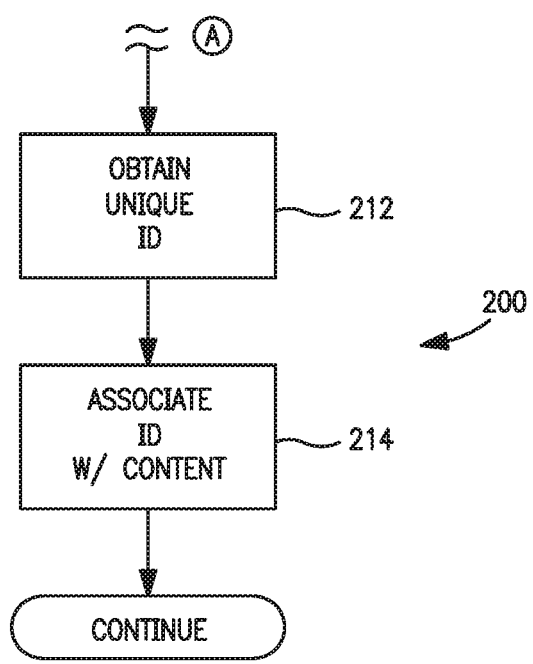

Referring now to FIG. 2, one embodiment of the method 200 of associating content with a network or other entity is described in the exemplary context of the aforementioned DVR/PVR application running on the customer's cable CPE 106, although it will be recognized that the invention is in no way so limited.

When the DVR application wishes to store a content stream on a local storage device, it first requests permission from the middleware implementation on the CPE to access the local storage device (step 202). In various implementations, the need to obtain such access to local storage may arise as a result of any number of different situations, such as e.g., a user-initiated command, a pre-scheduled record operation, a signal from another associated device or process, or otherwise.

When the middleware implementation receives this request, it checks for resource availability (step 204), and assuming such resources are available, grants storage access to the requesting application per step 206. The content or data is then stored to the requested resource per step 208. The middleware application may also optionally implement other tasks while the content stream is being stored to the allocated buffer or storage area. When the middleware receives an indication that the stream storage operation has ended (step 210), it obtains a unique identification (e.g., the orgID of the bearer network over which the stream was received, an entity, or a network or third-party content server) per step 212, and associates this identification with the received content stream (step 214).

It will be appreciated that the step of obtaining the unique identification may be performed at any time during the procedure, such as before the storage operation is even commenced (e.g., obtaining a valid identification being a precondition for commencing the content storage operation, or even assessing the availability of the required storage resources).

Per step 212 of the method 200 of FIG. 2, the middleware implementation obtains unique identification (e.g., orgID of the bearer network from which content is downloaded). In various embodiments, such identification may comprise different forms, such as a unique string of characters, numerals, random numbers, etc. chosen to be sufficiently long or permuted to guarantee uniqueness of identification. For example, the identification may be derived based on an algorithm running on the CPE, which obtains or generates the "unique" identification (such as after being provided a "seed" value). Hence, when properly seeded, the algorithm always produces the same value, which is unique to a particular entity or content source, but is re-used for various network users (i.e., all subscribers in the network obtain the same network identification).

Alternatively, the generation of the unique identification may be more unique, such as where a pseudo-random or random number generation system is utilized. The generated number is then recorded with or otherwise associated with a particular instantiation of the content stream (i.e., that recorded on Subscriber X's CPE or recording medium), and the association stored on the CPE 106, or another network agent such as a "content control" server. Playback of the recorded content is then only allowed, for example, where the playback application can obtain the matching (stored) identifier from the CPE 106 or the network agent (the latter via, e.g., an upstream call or signaling to the remote network agent).

In another embodiment, the identification comprises a specific bit pattern (such as a predetermined bitstream sequence) identifying the bearer network. This bitstream may be encrypted or unencrypted. In one exemplary variant, the unique network identification is obtained when the content stream storage is completed by parsing one or more incoming data streams. In another variant, the bearer network identification is pre-stored (either on the CPE 106 or on another network agent) and subsequently validated. Various other approaches are possible.

In one exemplary embodiment, for those CPE that implement OCAP middleware, such identification is based on the globally unique identifier (orgID) of the bearer network transmitted in the Application Information Table (AIT) or eXtended Application Information Table (XAIT) associated with the content recording application. In a bearer network where the network operator owns and downloads such recording applications, the corresponding orgID will be the network operator's globally unique identifier.

In the method 200 of FIG. 2, the middleware's association of the identification information with the stored content stream can be accomplished by any number of approaches. In one embodiment, software running on the CPE 106 creates a header at e.g., the beginning of a recording or stored file. For example, if the content is formatted using MPEG-2, a private data packet as defined by the ISO/IEC 13818-1 specification can be placed at the beginning of the recording. This packet can optionally be encrypted if desired, and contain the orgID passed to the middleware implementation.

In yet another embodiment, the association can be implemented as a look-up table or similar relational data structure that associates the stream with a unique identifier.

It will also be appreciated that the association of content/data with an identifier is not necessarily an exclusive process, in terms of either the identifier or the content/data. For example, it may be desired in certain implementations to associate two or more unique identifiers with a single given content stream, such as where a given network operator uses a heterogeneous network identification scheme (e.g., more than one network identifier, depending on geographic location or the like). Conversely, it may be desired to provide multiple different content or data aggregations (e.g., streams) or files with the same network or other unique identifier.

Figure 3:
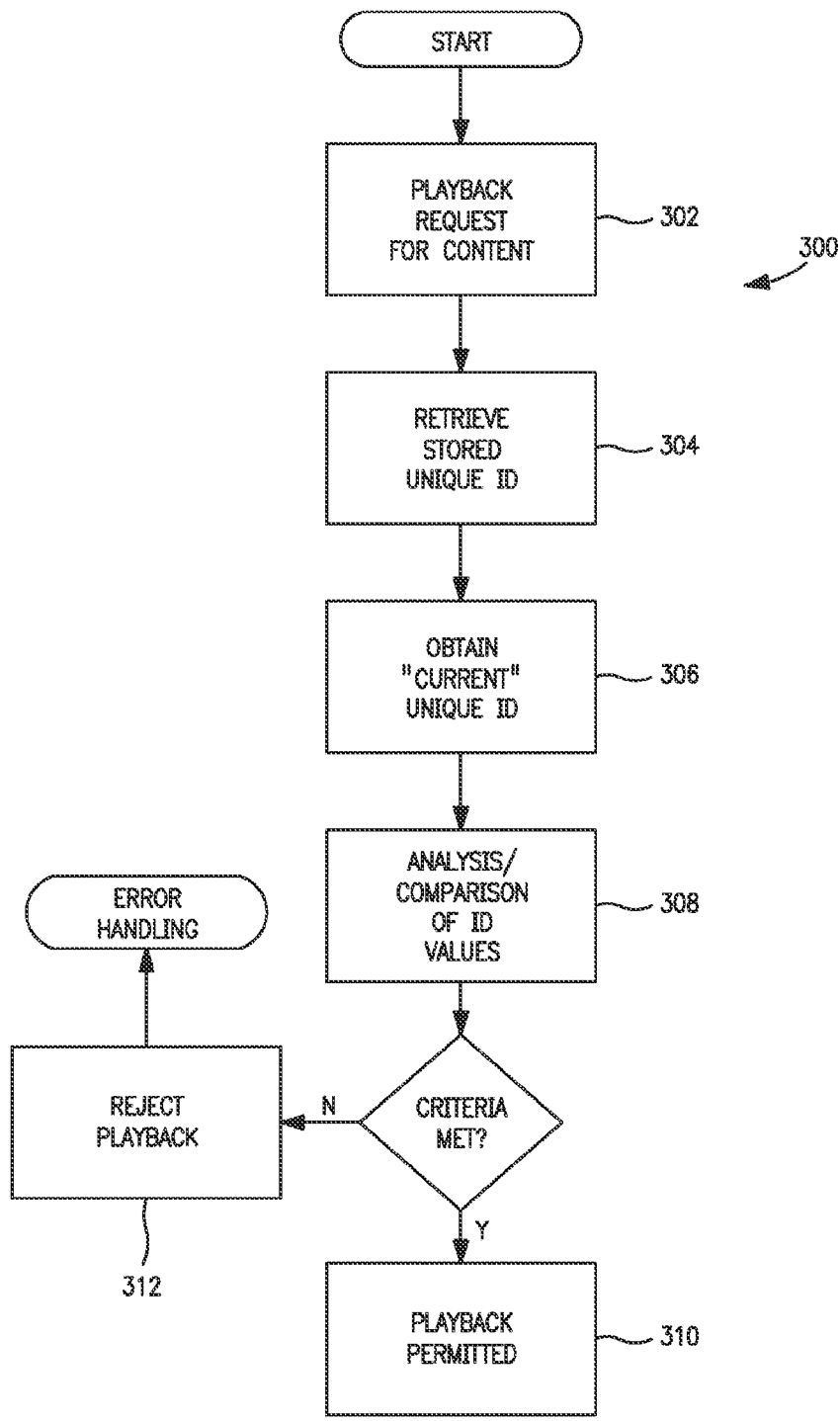
FIG. 3 is a logical flow diagram one exemplary method of associating a current (network) identification parameter with an identification parameter embedded within locally stored content according to the present invention.

Referring now to FIG. 3, one embodiment of the playback methodology according to the invention is described in detail. When playback of the stored or recorded content is desired, the above-described unique identification (e.g., network or organization ID) associated with the content is used for determining whether playback of the content is permitted. As shown in FIG. 3, when a playback application or other entity requests access to a stored program (step 302), the exemplary middleware implementation checks for and retrieves the network or organization identification stored with the requested program (step 304). In one embodiment, when an application attempts to playback the stored program, the CPE 106 decrypts a header to discover the associated orgID.

The middleware next retrieves the current network orgID (i.e., that of the network to which the middleware is in operative communication) if not already obtained (step 306). This value may be stored within the CPE 106 by the middleware at startup or during some other operation, or the middleware may be configured to obtain this value only upon validation of a playback request. Myriad different approaches to obtaining the "current" unique ID will be recognized by those of ordinary skill.

A comparison is next performed per step 308 between the current network identification obtained from the network, and that associated with the stored or recorded content. The CPE middleware checks the certificate chain of the application attempting to playback the recording. If the two match, the middleware continues executing to allow playback of the stream (step 310). This execution may include, for example, decryption of the content stream, allocation of one or more decoder resources, and extraction of the associated content or program data. In one embodiment, the matching of step 308 is performed by checking that the application has a certificate with the same orgID in its "organization" field as the stored program it is trying to access. If no match is found in step 308, the playback application's request is rejected (step 312). This rejection may optionally be associated with an error message informing the playback application that the content it requested was obtained from a different network or content source, and/or initiate other remedial or protective actions such as for example (i) recording a log of the failed playback attempt and any relevant data (e.g., date/time, content requested, etc.); (ii) "locking" of the storage/playback medium of the CPE 106 until an unlock code is entered; (iii) directing the user on corrective actions, etc. Myriad other such functionality may be implemented within the playback logic of the present invention as recognized by those of ordinary skill provided the present disclosure.

It is also noted that the present invention contemplates a broader definition of "matching" than simple correlation or correspondence. Specifically, the identification information passed in to the CPE recording process (e.g., that designating a unique source of the content) need not explicitly match the information obtained from the network upon an attempted playback. For example, a correlation table or matrix approach may be utilized, wherein a set of prescribed content or data source identifiers are correlated (after decryption, if required) to a network or MSO identifier; in this fashion, several authorized sources can be logically coupled to the network/MSO.

As is well known, digital certificates are commonly used for authenticating applications running on a device such as the CPE 106 or the like. The middleware specifications previously described herein provide security features such that applications downloaded or loaded onto the CPE 106 must be authenticated by that CPE. This is generally accomplished using security files. One of these files comprises a certificate file that contains a chain of certificates. The last or leaf certificate in this file belongs to the application vendor, developer, or owner. This is signed by a certificate from an entity (such as CableLabs), or the bearer network operator (e.g., MSO). The first certificate in the chain is a root certificate, and is self-signed. Each of these certificates is resident in the certificates file, and collectively comprise the application's certificate chain. In the exemplary OpenCable context, the security specification mandates that each certificate in the certificate file must contain an organization name that includes the orgID of the certificate owner. The format of a certificate organization name field is as follows:

"<company_name>.<organization_id>"

In the above construct, <company_name> is a string of characters assigned by the owner of the certificate, and <organization_id> is a string of characters representing the numerical orgID of the company owning the certificate.

In the exemplary embodiment of the invention, the network identification information available within digital certificates is used, thereby advantageously requiring only minimal changes from existing CPE software implementations that are based on the aforementioned specifications. Hence, the content association functionality described herein can be completely implemented in the typical content (e.g., cable or satellite) network via only minor software upgrades that can be downloaded directly to the user's CPE 106 over the network and installed remotely. This precludes any costly and laborious hardware or firmware upgrades. However, it will be recognized that other mechanisms for providing the content association functions exist.

Figure 4:
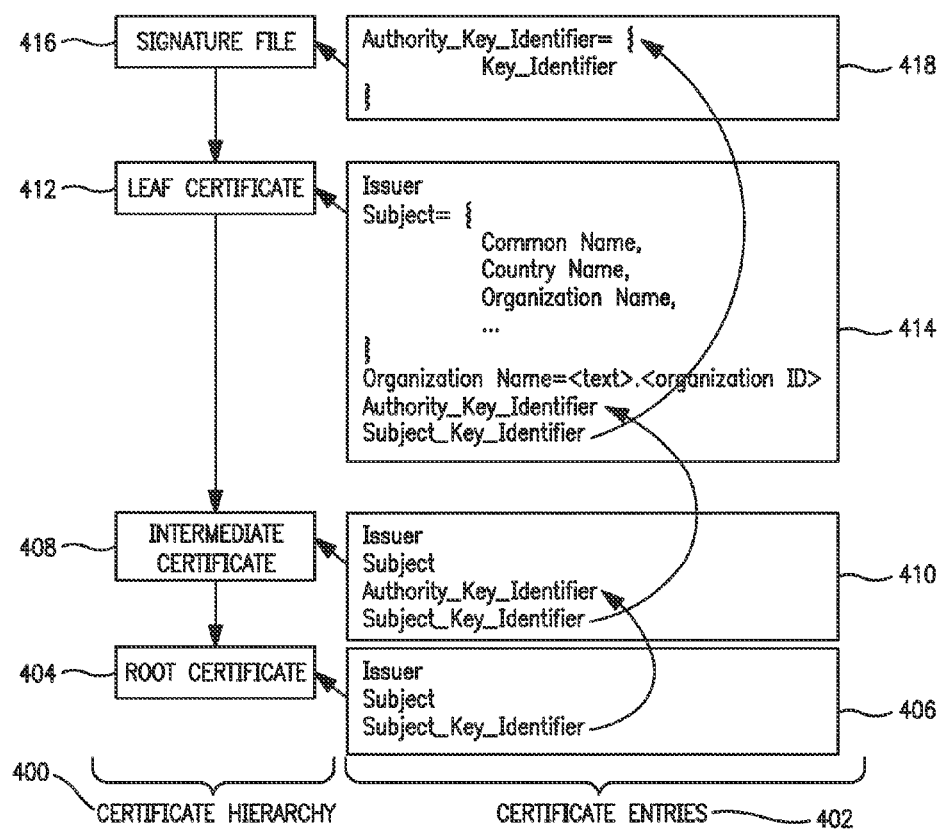
FIG. 4 is a graphical representation of an exemplary hierarchy of cryptographic certificates used in conjunction with one embodiment of the invention.

Referring now to FIG. 4, one embodiment of a hierarchy of digital certificates used for secure authentication of software applications according to the invention is shown. In FIG. 4, the first column 400 (labeled "certificate hierarchy") shows a hierarchy of digital certificates where the root certificate 404 comprises a self-signed certificate present in the middleware implementation. The certificate chain of an application is included in a security file, and comprises an intermediate certificate 408, a leaf certificate 412, and a signature file 416. Corresponding exemplary entries in each of the certificates are shown in the second column 402 (labeled "certificate entries") in FIG. 4. Two entries in each intermediary certificate are used to link an application's signature file to the root certificate in the CPE 106 or similar platform. The Authority_Key_Identifier entry provides a mechanism for identifying the public key corresponding to the private key used to sign a certificate. The Subject_Key_identifier entry provides a mechanism for identifying certificates that contain a particular public key.

As shown in FIG. 4, the exemplary authentication process involves linking the Authority_Key_Identifier entry 418 of an application's signature file 416 to a leaf certificate 412 by matching a Subject_Key_Identifier entry 414 in the certificate 412, which in turn is authenticated by the root certificate via a chain of zero or more intermediate certificates with Authentication_Key_identifier and Subject_Key_Identifier entries 410 leading to the Subject_Key_Identifier entry 406 of the root certificate. One of the entries of the exemplary digital certificate of FIG. 4 is an organization identification entry, which uniquely represents the organization that provides the certificate.

It will be appreciated that while described in the context of an identifier for a registered entity (e.g., company), the present invention is in no way so limited, and in fact can be used with other types of unique identification mechanisms which accomplish the goal of providing a coupling or identification between content (or software) and a given entity. For example, couplings between other types of entities and subject matter (e.g., content, software applications, etc.) may be formed using the methods of the present invention.

In one such alternate coupling, the downloaded content or application is coupled indirectly through the CPE 106 and the bearer network infrastructure 101 to a remote third party server, such as an Internet-based content or gaming server. Whereas in the aforementioned embodiment, the content is coupled to the MSO's network via the orgID or similar value and the CPE 106, the present embodiment couples the content/application to a server transparently through the bearer network, such that the content or application cannot be enabled or used without validation (association) between the identifying information embedded in that content/software and that of the authorized server. Here, the identifying information is not specific to the bearer network, but rather the content source or other such entity. In one variant, the gaming application comprises a distributed application (DA) with client (e.g., CPE) and server portions, wherein initial (and optionally periodic) upstream communications with the server are required in order to validate the application to the server. In this fashion, the application is platform-agnostic (i.e., it does not necessarily need to be stored or run on any given CPE, including that over which it was downloaded), yet must be authenticated using the unique and secure identification parameter(s) embedded in the applications/content at time of download. These secure identification parameters may be derived, for example, through communication between the application/content download servers of the bearer network (e.g., HFC cable network) and the trusted third-party server (e.g., IP server). The trusted server may comprise, for example, a secure IP server of the manufacturer or distributor of the gaming software/content, a studio, a music download service, television network, etc. Myriad other approaches are also possible consistent with the invention.

In another variant, the aforementioned "indirect" coupling or association is used in conjunction with the direct network-based coupling of prior embodiments, thereby requiring both (i) use of the content/application on a CPE and network from which it was downloaded, and (ii) validation of the content/application by a third party server as to authenticity. This is accomplished using two distinct identification parameters, the first being the MSO's orgID or similar previously described (to associate the content to the network), and the second being the content developer or administrator's identification parameter (which may also be an orgID, yet different from that of the MSO).

CPE Architecture and Operation—

Figure 5:
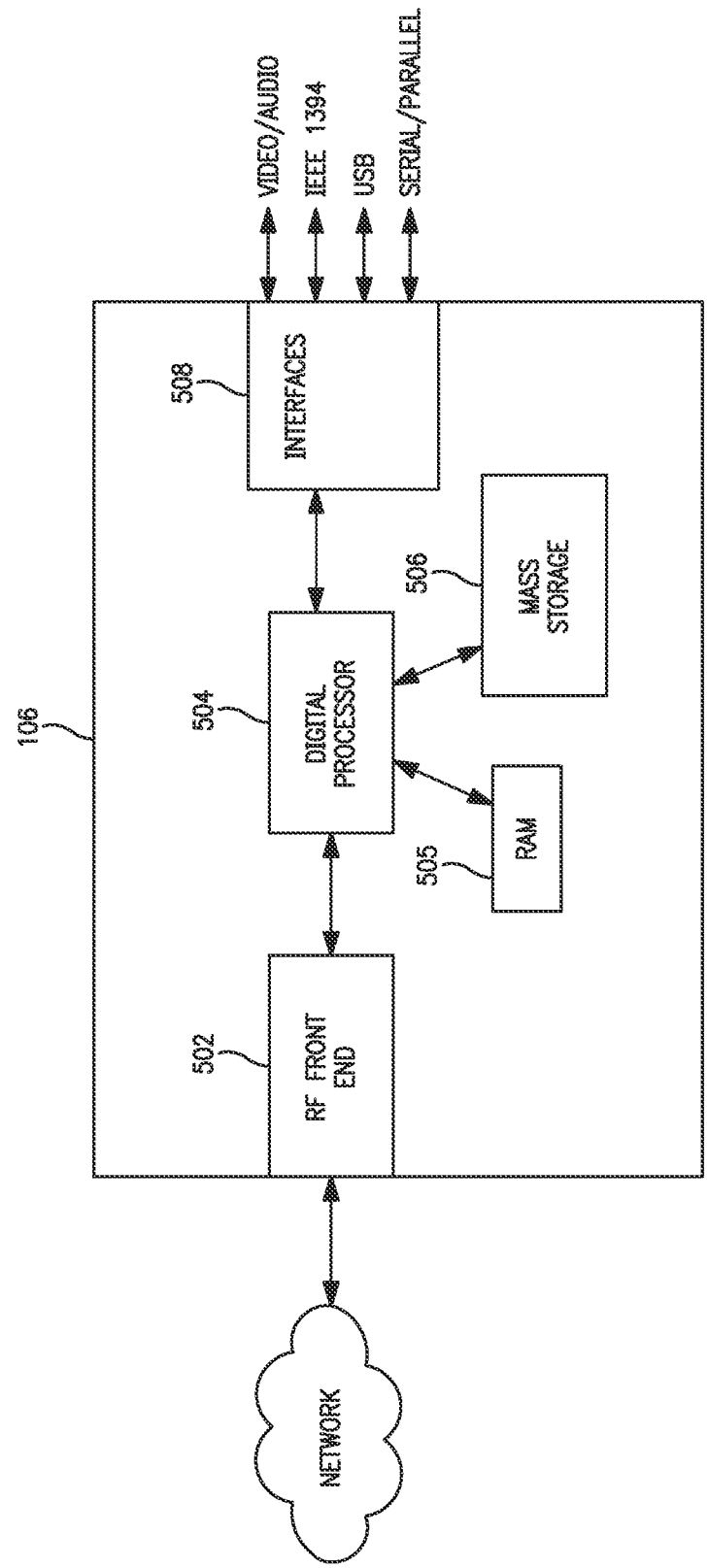
FIG. 5 is a functional block diagram illustrating a first exemplary embodiment of consumer premises equipment (CPE) adapted for use in a cable network and implementing the content association methodologies of the present invention.

FIG. 5 illustrates a first embodiment of the improved client device (e.g., CPE 106) with the content association capability according to the present invention. As shown in FIG. 5, the device 106 generally comprises and OpenCable-compliant embedded system having an RF front end 502 (including demodulator and decryption unit) for interface with the HFC network 101 of FIG. 1, digital processor(s) 504, RAM 505 and mass storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the device (deleted from FIG. 5 for simplicity) include RF tuner stages, buffer memory (which may be implemented in the RAM 505 or otherwise), various processing layers (e.g., DOSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein.

The device 106 of FIG. 5 is also provided with an OCAP-compliant monitor application and Java-based middleware which, inter alia, manages the operation of the device and applications running thereon. The OCAP monitor comprises a trusted application which has permissions to access various CPE components and processes, including accessing the designated storage device for incoming media or content streams, as well as obtaining a unique identification previously described herein.

It will be recognized by those of ordinary skill that myriad different device and software architectures may be used consistent with the content association technology of the invention, the device of FIG. 5 being merely exemplary. For example, the storage device and/or content association software may be disposed on a locally networked (e.g., LAN or PAN) client device that is in signal communication with the CPE 106 via a wired or wireless interface.

Figure 5A:
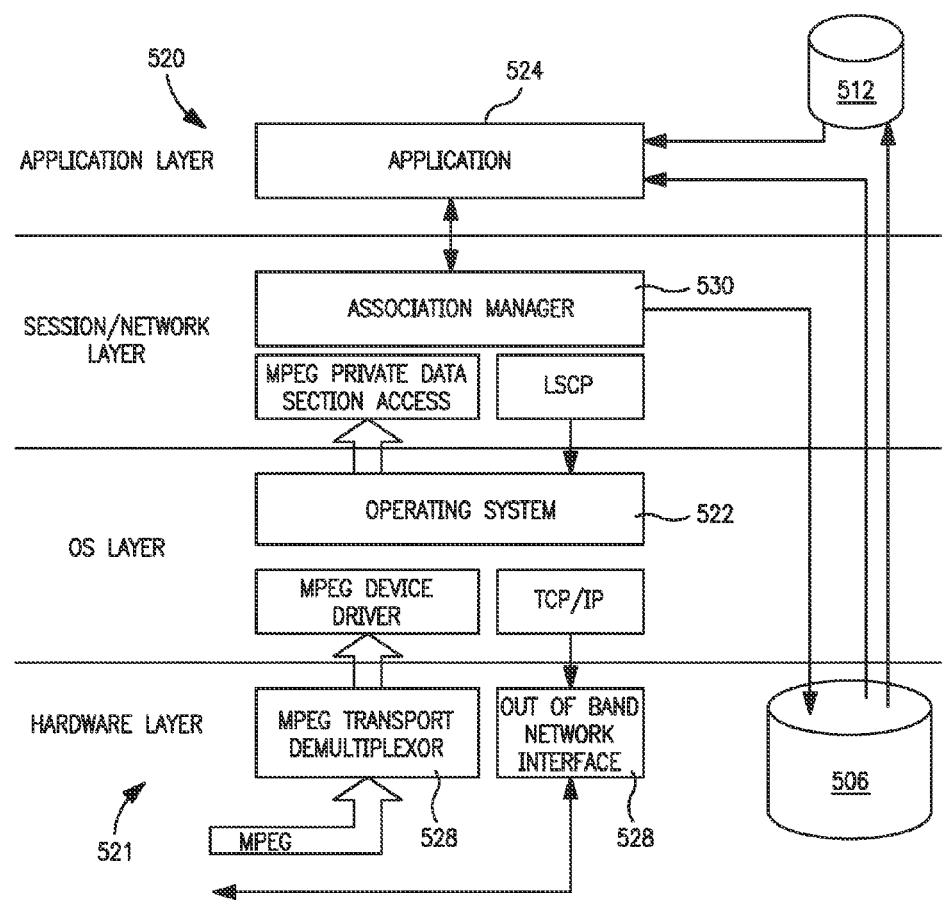
FIG. 5a is a logical block diagram illustrating a first exemplary software architecture that may be used consistent with the present invention.

FIG. 5a shows an exemplary implementation of the current invention within an OCAP-compliant cable CPE protocol stack 520. This protocol stack 520 includes a hardware layer 521, operating system 522 and cable network interface functions 528, as well as applications 524 at its highest layer. A software component 530 labeled "association manager" is shown; this component implements the content association functionality previously described, and can be part of the middleware or a separate module as desired. The association manager 530 (and middleware) arbitrates access to the local storage device 506 or a distributed storage device 512 such as a DVD recorder), upon requests from playback or other applications to store/access the stored content. While the association manager 530 is shown at the session/network layer it will be appreciated that the association manager 530 can be disposed wholly or partly at other layers of the protocol stack 520.

The major components of the content association management system of the present invention may be implemented using various computer languages (e.g., C, C++, Java), within various middleware environments. Examples of such middlewares include, but are not limited to, OCAP, MHP, Multimedia Hypertext Experts Group (MHEG), and Digital television Application Software Environment (DASE).

As can be appreciated by those of ordinary skill, the mass storage device 506 of FIG. 5 may comprise, either alone or in combination with a DVR or other such non-permanent device, a permanent storage mechanism or fixed/removable physical media. For example, the apparatus and methods set forth in commonly owned U.S. patent application Ser. No. 11/080,693 filed Mar. 14, 2005 entitled "METHOD AND APPARATUS FOR NETWORK CONTENT DOWNLOAD AND RECORDING", now U.S. Pat. No. 8,028,322, previously incorporated herein, by reference in its entirety, may be used in conjunction with the content association mechanisms of the present invention. Specifically, in one variant, the dual-layer or other high density recording mechanisms of the aforementioned invention can be used as the CPE storage device described above; the unique identification information can be embedded into or otherwise associated with the recorded medium (e.g., 2-layer DVD), such that when the medium is played back, presentation of the proper network or organization ID is required in order to allow such playback to occur on that particular platform. Accordingly, a physically transportable, but logically "associated" medium is created.

As another alternative, a removable medium (e.g., magnetic or IC-based storage medium such as a USB key, removable disk cartridge, or the like) may used as the storage/recording device 506. This underscores one advantage provided by the present invention; i.e., the ability to encode the recorded data with the identification information before the stored content is transported to another playback mechanism, and then subsequently preclude the "locked" (associated) content from being played back unless the proper orgID or similar identification information is presented by the playback platform.

Such association may also be used as a condition precedent for recording the medium, yet not impose any further restrictions on playback. For example, the storage device (e.g., DVR hard drive) from which the permanent recording device obtains the content to record, or the permanent recording device itself, may be "locked" unless a valid unique association ID is present.

Using the techniques previously described herein, the association of the DVD (or other such medium carrying the content) may also be with third party entities, such that playback of the DVD is frustrated unless proper login and authentication procedures to the third-party web server or the like are completed, and the unique ID or other parameter of the content matched by the server.

Business Considerations—

As noted in co-owned U.S. application Ser. No. 11/080,693 filed Mar. 14, 2005 and entitled "METHOD AND APPARATUS FOR NETOWRK CONTENT DOWNLOAD AND RECORDING", now U.S. Pat. No. 8,028,322 previously incorporated herein by reference in its entirety, many content developers (e.g., studios) are reticent to release new content (e.g., movies) via a cable or satellite network until well after the retail sale and rental distribution channels have been at least partly exploited. This stems from the desire to limit the competitive effect such early distribution over cable/satellite networks might have on retail sales or rentals; i.e., if the content is available for viewing via cable, fewer people may decide to purchase or rent a physical copy.

However, by employing the content association techniques disclosed herein (especially in concert with the recording and protection mechanisms set forth in U.S. application Ser. No. 11/080,693), increased assurance of distribution channel integrity is provided. Specifically, if a content provider knows that their "new release" content can only be (i) recorded pursuant to a purchase, and/or (ii) played back on a device connected to the original distributing network, they may be much more amenable to distributing the content over cable or satellite contemporaneously with retail/rental release.

Furthermore, the various copyright or other rights management techniques set forth in co-owned U.S. application Ser. No. 11/080,693 filed Mar. 14, 2005 and entitled "METHOD AND APPARATUS FOR NETWORK CONTENT DOWNLOAD AND RECORDING", now U.S. Pat. No. 8,028,322, previously incorporated herein by reference in its entirety, can also be used in conjunction with the content association approach of the present invention, in order to provide added or complementary assurances of rights protection for the content. For example, digital watermarking or similar steganographic techniques can be employed at the content server or the CPE 106 itself to embed such data within the content during storage/recording or playback. In this fashion, surreptitious attempts to stream the stored content data off the CPE after playback authorization (per FIG. 3 herein), such as via another port of the CPE, are to some degree frustrated by the watermarking embedded in the data. Alternatively, hardware/firmware "locking" of other resources and interfaces during playback may be used to limit the use of the content data being played back.

It will be appreciated that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method of operating a content delivery network so as to limit playback of digital content distributed over said content delivery network to only certain ones of a plurality of computerized client devices coupled to said content delivery network, said method comprising:
receiving, from a first one of said plurality of computerized client devices, a request to store said digital content on a network data storage device in data communication with said plurality of devices via said content delivery network;
storing said digital content on the network data storage device;
associating, with said stored digital content, data representative of first information identifying a first network associated with a source of said digital content;
subsequently receiving data representative of second information identifying a second network associated with a second one of said plurality of devices;
using at least one computer program to compare (i) said data representative of said first information identifying the first network associated with said source of said digital content to (ii) said data representative of said second information identifying the second network associated with said second one of said plurality of computerized client devices; and
when it is determined that at least a partial match exists between said data representative of first information and said data representative of second information based on said comparison thereof, allowing said second one of said plurality of computerized client devices to access said digital content from said network data storage device.

2. The method of claim 1, wherein said first one of said plurality of computerized client devices and said second one of said plurality of computerized client devices comprise a same device.

3. The method of claim 1, wherein said first one of said plurality of computerized client devices and said second one of said plurality of computerized client devices are in data communication with one another.

4. The method of claim 1, wherein said first one of said plurality of computerized client devices and said second one of said plurality of computerized client devices comprise different devices, and said network data storage device comprises networked media which can be accessed by both said first and said second ones of said plurality of computerized client devices.

5. The method of claim 1, wherein said storing comprises permanently recording said content onto a recording medium.

6. The method of claim 5, wherein said permanently recording comprises:
determining that a user has purchased said content; and
based on said determining, performing said recording.

7. The method of claim 5, wherein said storing comprises storing rights protection data with said digital content.

8. The method of claim 1, wherein said storing comprises storing rights protection data with said digital content.

9. A server device disposed at a head-end of a content delivery network, said server device comprising:
a storage medium comprising a computer program stored thereon; and
a processor configured to execute said computer program, said computer program comprising a plurality of instructions which are configured to, when executed, cause said server device to:
receive digitally rendered programming content distributed to a client device via said content delivery network;
cause said digitally rendered programming content to be stored on a network storage device disposed at the head-end, the network storage device being in data communication with said client device;

associate (i) first information identifying a first network coupled to a source of said digitally rendered programming content with (ii) said digitally rendered programming content, said association comprising a creation of a data structure associated with said digitally rendered programming content, said data structure comprising said first information encrypted within said data structure;

analyze said first information identifying said first network and subsequently received second information identifying a second network coupled to said client device; and based at least in part on said analysis, decrypt said first information from said data structure associated with said digitally rendered programming content, and allow playback of said programming content at said client device.

10. The server device of claim 9, wherein said first information and said second information each comprise organization ID (orgID) information.

11. The server device of claim 9, wherein said plurality of instructions are further configured to cause said server device to log data relating to at least those instances where said playback is restricted.

12. The server device of claim 9, wherein said storage of said digitally rendered programming content comprises permanently recording said programming content at least partly in response to a determination that a user of said client device has purchased said programming content.

13. A server device in data communication via a network with a client device, said server device configured to:

store, in a network storage device, digitally rendered programming content received by said client device over said network;

store, in said network storage device, information which uniquely identifies a source network of said digitally rendered programming content with said programming content;

subsequently receive a playback request for said stored digitally rendered programming content from a requesting entity;

based at least on a match between (i) said information which uniquely identifies said source network and (ii) information which uniquely identifies a network associated with said requesting entity, determine whether display of said digitally rendered programming content by said requesting entity is permitted; and after said determination, selectively enable said digitally rendered programming content to be retrieved from said network storage device and displayed by said requesting entity.

14. The device of claim 13, wherein said requesting entity comprises an application program configured to run on said client device, said information comprising data representative of an organization ID (orgID) associated with said network.

15. The device of claim 13, wherein said server device is further configured to receive data relating to at least one first command from said client device, and in response to said data relating to the at least one first command, store said digitally rendered programming content.

16. The device of claim 13, wherein said storage of said digitally rendered programming content comprises permanently recording said digitally rendered programming content at least partly in response to a determination that a user of said client device has purchased said digitally rendered programming content.

17. A computerized method of playing digitally rendered content on a client device in data communication with a content distribution a network, the method comprising:

receiving digital data relating to a software application from a software distribution process of the content distribution network;

causing establishment of data communication between the received digital data relating to the software application and a content access process of the content distribution network;

requesting from the content access process, via at least the received digital data relating to the software application, access to digitally rendered content stored on a storage device of the content distribution network;

obtaining data representative of a first identifier using at least the received digital data relating to the software application, the data representative of the first identifier being associated with the stored digitally rendered content;

obtaining data representative of a second identifier associated with the content distribution network;

evaluating at least the data representative of the first and second identifiers using the received digital data relating to the software application; and based at least on determining a prescribed relationship between the data representative of the first and second identifiers, enabling access to the digitally rendered content via the client device.

18. The method of claim 17, further comprising receiving the digitally rendered content through a secure distribution process of the content in data communication with the content access process.

19. The method of claim 18, wherein the secure distribution process comprises a trusted third-party content server configured for distributing one or more of: (i) gaming content, (ii) digital music content, and/or (iii) programming content.

20. The method of claim 19, wherein the trusted third-party content server comprises the software distribution process.

21. The method of claim 17, wherein the client device comprises an Internet Protocol (IP)-enabled mobile device, and is further enabled for communication with the content access process via at least one interposed wireless network and said Internet Protocol.

22. The method of claim 17, wherein the data representative of the first identifier associated with the stored content comprises a unique organization ID that is embedded within the stored digitally rendered content, and the data representative of the second identifier comprises a unique network ID that is obtained by the client device either directly or indirectly from a network-side server process.

* * * * *